Patented Aug. 17, 1926.

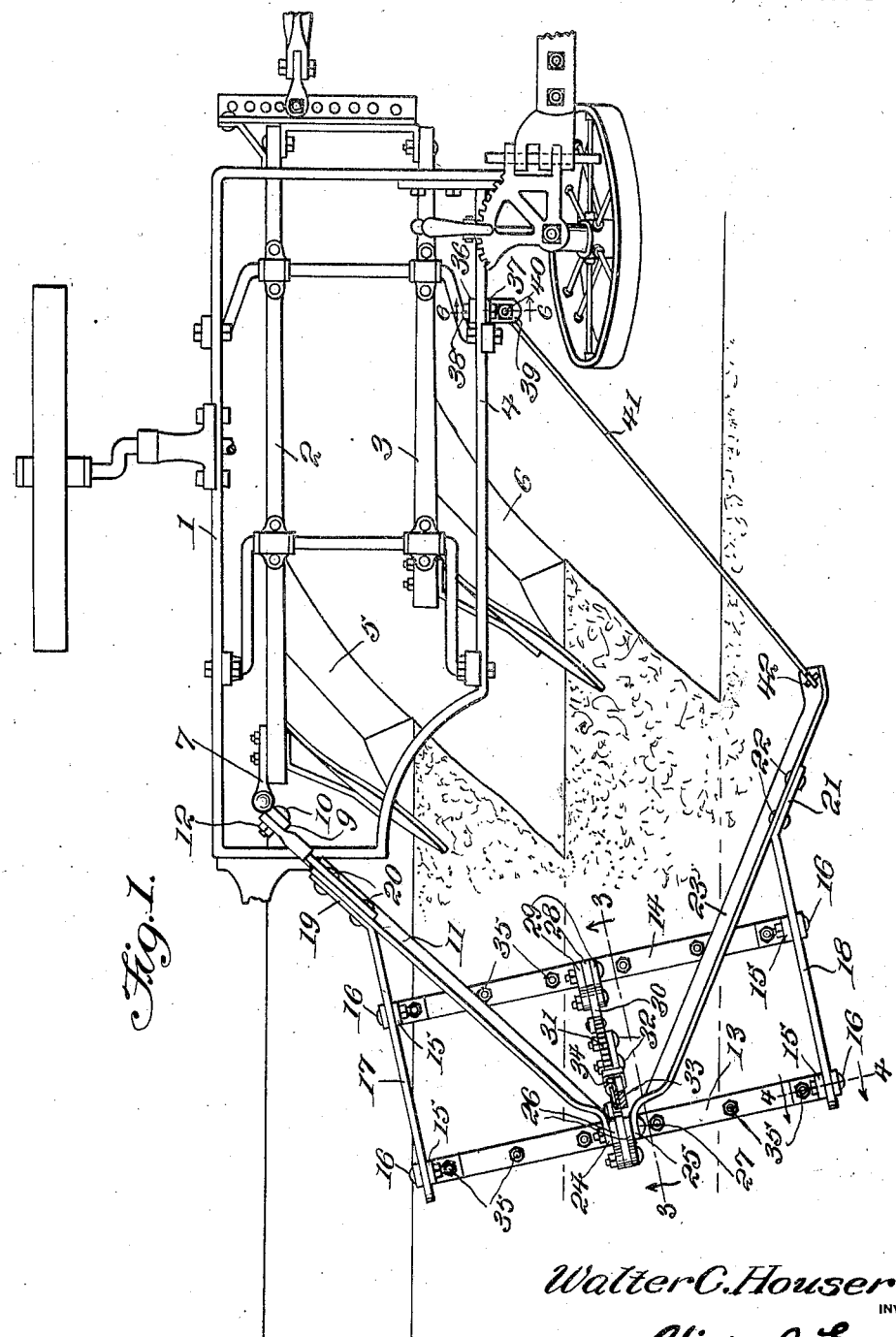

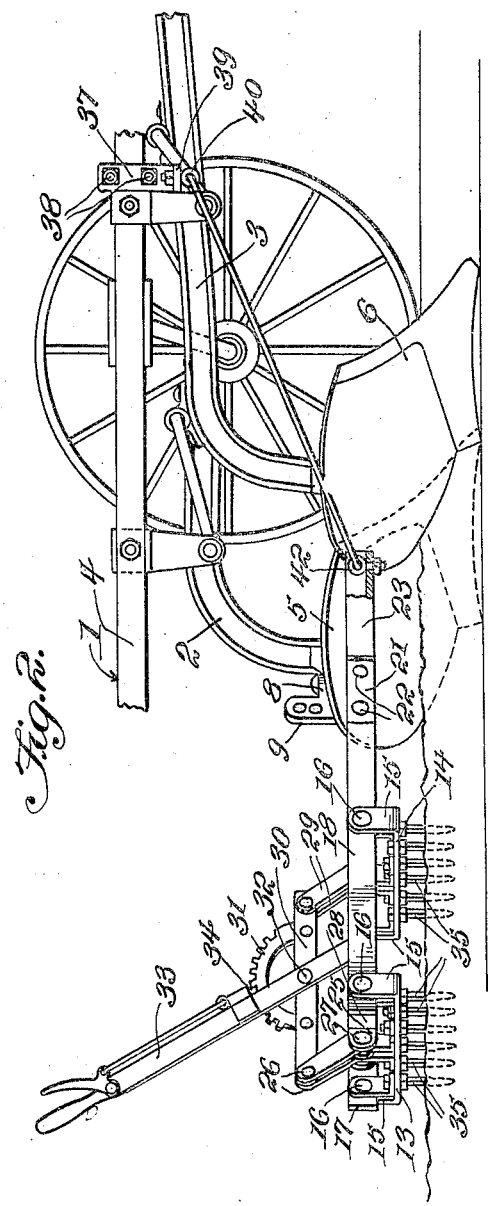

1,596,838

UNITED STATES PATENT OFFICE.

WALTER C. HOUSER, OF ELWOOD, NEBRASKA.

HARROW ATTACHMENT FOR PLOWS.

Application filed February 3, 1926. Serial No. 85,767.

My present invention has reference to a harrow attachment for sulky or other gang plows.

An object is the provision of means for attaching a toothed harrow to a wheeled plow, in a manner whereby the harrow, is arranged at a desired angle at the rear of the plow in a manner whereby the right hand side of the harrow is retained an appreciably greater distance from the front mold board than is the left hand side of the harrow with respect to the rear mold board of the plow, so that the furrowed soil will not fall upon the harrow and the plow will be relieved of side draft, while at the same time all of the earth thrown up by the plow shares will be acted upon by the several teeth of the harrow.

A further object is the provision of a harrow attachment for gang plows, either horse or tractor drawn, of a construction whereby the same may be easily attached to the plow, vertically adjusted with respect to the frame of the plow, positioned angularly to the rear and at one side thereof, susceptible to having its teeth swung to desired angles and of a construction and arrangement whereby the ground will be nicely smoothed directly after the same has been plowed so that all clods will be broken and the plowed soil turned over while the moisture still remains therein.

A still further object is the construction of a harrow and a means for attaching the same to a plow which is light in weight, durable in service, easily attached to and detached from the plow and which will not retard the progress of the plow when the latter is drawn over a field by draft animals or by a tractor.

To the attainment of the foregoing broadly stated objects and many others which will appear as the nature of the invention is better understood, reference is to be had to the drawings which accompany and form part of this application.

In the drawings:

Figure 1 is a top plan view showing the improvement in applied position.

Figure 2 is a side elevation thereof.

Figure 3 is a sectional view on the line 3—3 of Figure 1.

Figure 4 is a sectional view on the line 4—4 of Figure 1.

Figure 5 is a detail elevation of one of the plow beams to illustrate the hingedly connected clevis bar thereon.

Figure 6 is a sectional view approximately on the line 6—6 of Figure 1.

Referring now to the drawings in detail, the numeral 1 designates a frame for a sulky or other gang plow. The frame is mounted on the usual wheels and supports thereon the swingable and therefore vertically adjustable plow beams 2 and 3, respectively. For distinction the right hand or furrow side of the plow side of the frame is indicated by the numeral 4. On the ends of the short beam 3 and the longer beam 2 there are supported in the usual manner the plow shares 5 and 6, respectively, and these shares are braced to the beams in the usual manner. Secured to the rear of the plow beam 2, by the means that secures the brace and the plow shares 4 thereon, there is a bracket 7. This bracket is in the nature of a plate having an eye on the rearwardly extending portion thereof, and embracing this eye and secured thereto there are rearwardly extending arms or fingers 8 on a clevsi plate 9. The clevis plate is thus hingedly connected to the bracket 7 and consequently to the beam 2.

There is passed through any one of the series of openings in the clevis plate 9 a bolt member 10. This bolt member also passes through a suitable opening in the straight end of an angle iron 11. The angle iron 11 is disposed at a rearward angle to the rear, and in the direction of the right hand side 4 of the frame 1. The pivot 16 is engaged by a bolt 12, so that the brace angle iron 11 is removably secured to the frame 1.

The harrow comprises spaced longitudinally extending plates 13 and 14, respectively. Fixedly secured to the ends and on the upper faces of the frame members 13 and 14, there are upstanding members 15, respectively, and pivotally secured, as at 16, to the said members 15 there are plates 17 and 18, respectively. The plates 17 and 18 provide the end members of the harrow frame, and the plate 17 has its end which projects beyond the forward end of the harrow frame, arranged at an angle, as indicated by the numeral 19, and this angle portion is riveted, as at 20, to the member 11. The plate 18 also has its forward and projecting end merging into an extension 21 which is arranged at an opposite angle to the extension 19 of the plate 17. The end 21 of the plate 18 is riveted, as at 22, to an angle plate 23. The plate 23 is arranged at an opposite angle to the plate 11, but both of these plates have their inner ends flattened and extended over the member 13 of the harrow frame to provide what I will term ears and which are designated by the numerals 24 and 25, respectively. These ears are pivotally secured between spaced upstanding members 26 that arise from the frame members 13. The pivot for these members for distinction, is indicated by the numeral 27. The pivots 27 also pass through a plate 28 that is arranged transversely over the cultivator frame. The plate 28 forms the central reinforcing or bracing member for the frame and is disposed only a slight distance above the frame members 13 and 14. The opposite end of the plate 28 also passes between a pair of upstanding members 29 that arise from the center of the frame member 14. The upstanding members 26 and 29 are arranged at the same angle, as illustrated most clearly in Figure 3 of the drawings and pivoted between these upstanding members, at the outer or top ends thereof, there is a plate 30. On the plate 30 there is secured an arched rack 31, and pivoted, as at 32, to the plate 28, and as at 32 to the plate 30, there is a lever 33. This lever carries a hand operated dog 34 to engage with the teeth of the rack 31. The members 13 and 14 of the cultivator frame have bolted or otherwise secured thereto equidistantly spaced cultivator teeth 35.

On the right hand side 4 of the plow frame 1, adjacent to the forward end of the said frame, there is bolted inner and outer plates 36 and 37, respectively. The bolts 38 which secure the plates on the frame member contact with the upper and lower edges of the said frame member, and these bolts are, of course, engaged by nuts. The outer plate 37 has an outwardly directed angle end 39, and removably secured to the said end there is an eye bolt 40. This eye bolt engages one of the rounded or eye ends of a brace or connecting rod 41, the second end of the said rod having an eye end which is connected to an eye bolt 42 on the outer and straight end of the angle plate 23.

With a construction as above described it will be noted that the harrow is attached to the plow in a manner whereby the earth thrown up by the plow shares will be acted upon by each of the several teeth 35 on the harrow, as the said harrow frame is arranged at an angle and at the rear of the plow frame. It will be further noted that the harrow frame will be adjusted to desired angles with respect to the plow frame, as the rods 41 may differ in length or a single rod 41 may be adjustably connected between the elements 23 and 39. The harrow frame may have its pivotally supported tooth carrying members 13 swung and sustained at desired angles by the manipulation of the lever 33 and it is believed that the foregoing description when carefully read in connection with the accompanying drawings will fully set forth the simplicity and advantages of my construction to those skilled in the art to which this invention relates, it being undersood that I am not to be restricted to the precise details herein set forth and may make such changes therefrom as fairly fall within the scope of what I claim.

Having described the invention, I claim:—

1. The combination with the frame of a wheeled plow and the plow carrying beams therefor, of a harrow, said harrow including parallel longitudinally arranged tooth carrying members, pivoted brace bars at the ends of the members, angle members centrally pivoted to the rear of the harrow frame, and to which the brace bars are connected, a hinged connection between the longer plow carrying beam and one of said angle members, an adjustable rod connection between the second angle member and one side of the plow frame, and means for swinging and for sustaining the tooth carrying members of the harrow frame to arrange the teeth thereof at desired angles.

2. The combination with the frame of a wheeled plow and the plow carrying beams therefor, of a harrow arranged to the rear of the plow shares and angularly with respect to the frame, said harrow comprising spaced parallel tooth carrying members, upstanding elements secured to the ends thereof, brace members pivotally connected to the upstanding members, upstanding members at the center thereof, a brace pivotally secured between said last mentioned upstanding members, angle arms connected to the tooth carrying portions of the harrow and pivotally secured to the said central upstanding members, a rod pivotally connected to the arms, a segmental rack on the rod, a lever pivoted to the rod and likewise pivoted to the central brace, a tooth carrying dog on the lever for engaging with the rack, angle members pivoted to the rear upstanding members and to which the end braces are secured, a swingable clevis on the longer plow beam to which one of the said angle members is adjustably connected, and an adjustable rod connection between the second angle member and one side of the plow frame.

In testimony whereof I affix my signature.

WALTER C. HOUSER.